United States Patent
Alon et al.

(10) Patent No.: US 7,668,129 B2
(45) Date of Patent: Feb. 23, 2010

(54) LEARNING MECHANISM TO CONFIGURE POWER SAVE PARAMETERS FOR AUTOMATIC POWER SAVE DELIVERY

(75) Inventors: Ayelet Alon, Haifa (IL); Boris Ginzburg, Haifa (IL)

(73) Assignee: Intel Corporation, Santa Clara, CA (US)

( * ) Notice: Subject to any disclaimer, the term of this patent is extended or adjusted under 35 U.S.C. 154(b) by 704 days.

(21) Appl. No.: 11/393,084

(22) Filed: Mar. 30, 2006

(65) Prior Publication Data

US 2007/0238438 A1    Oct. 11, 2007

(51) Int. Cl.
*G08C 17/00*    (2006.01)
(52) U.S. Cl. .................. 370/311; 370/252; 455/343.2
(58) Field of Classification Search ................ 370/311, 370/310; 455/343.2, 343.1, 334, 130
See application file for complete search history.

(56) References Cited

U.S. PATENT DOCUMENTS

| | | | |
|---|---|---|---|
| 5,949,812 | A | 9/1999 | Turney et al. |
| 6,704,561 | B2 | 3/2004 | Kuroiwa |
| 6,804,542 | B1 | 10/2004 | Haartsen |
| 6,917,598 | B1 | 7/2005 | Emeott et al. |
| 6,952,785 | B1 | 10/2005 | Diab et al. |
| 6,973,052 | B2 | 12/2005 | Wang et al. |
| 7,281,144 | B2 | 10/2007 | Banginwar et al. |
| 7,433,670 | B2 | 10/2008 | Benveniste |
| 7,477,616 | B2 | 1/2009 | Wang et al. |
| 7,505,795 | B1 | 3/2009 | Lim et al. |
| 2004/0001477 | A1 | 1/2004 | D'Amico et al. |
| 2004/0081133 | A1 | 4/2004 | Smavatkul et al. |
| 2004/0190467 | A1 | 9/2004 | Liu et al. |
| 2004/0264396 | A1 | 12/2004 | Ginzburg et al. |
| 2005/0009578 | A1* | 1/2005 | Liu ........................... 455/574 |
| 2005/0018624 | A1 | 1/2005 | Meier et al. |
| 2005/0136833 | A1 | 6/2005 | Emeott et al. |
| 2005/0138451 | A1 | 6/2005 | Simpson et al. |
| 2005/0152324 | A1* | 7/2005 | Benveniste .................. 370/338 |
| 2005/0237984 | A1 | 10/2005 | Benveniste |
| 2006/0039395 | A1 | 2/2006 | Perez-Costa et al. |
| 2006/0062181 | A1 | 3/2006 | Chou |

(Continued)

FOREIGN PATENT DOCUMENTS

KR    10-0490492    5/2005

(Continued)

OTHER PUBLICATIONS

Kuehnel, Thomas, "Proposed Normative Text for EDCA," IEEE P802.11 Wireless LANs, pp. 1-8, May 2003.

(Continued)

*Primary Examiner*—Min Jung
(74) *Attorney, Agent, or Firm*—Blakely, Sokoloff, Taylor & Zafman LLP (57) ABSTRACT

A mechanism to configure power save parameters of a wireless client station. When data frames carrying voice, video, or other multimedia traffic are received at the client station via a wireless link, a frame rate of the received data frames is measured for a period of time. Then a power save parameter of the client station is configured based on the measuring to adjust delivery of the data frames to the client station during a power save state of the client station.

19 Claims, 6 Drawing Sheets

U.S. PATENT DOCUMENTS

| | | | |
|---|---|---|---|
| 2006/0229023 A1* | 10/2006 | Alon et al. ............... 455/69 |
| 2006/0252449 A1 | 11/2006 | Ramesh |
| 2007/0004374 A1 | 1/2007 | Kneckt |
| 2007/0036096 A1* | 2/2007 | Sinivaara ............... 370/318 |
| 2007/0081504 A1* | 4/2007 | Shih et al. ............... 370/338 |
| 2007/0143637 A1* | 6/2007 | Tsai ............... 713/300 |
| 2007/0147330 A1* | 6/2007 | Smith et al. ............... 370/346 |
| 2007/0161364 A1 | 7/2007 | Surineni et al. |
| 2007/0259700 A1 | 11/2007 | Meier et al. |

FOREIGN PATENT DOCUMENTS

| | | |
|---|---|---|
| WO | WO 2005/011204 A2 | 2/2005 |
| WO | WO 2007/117904 A1 | 10/2007 |

OTHER PUBLICATIONS

Wi-Fi Alliance Technical Committee Quality of Service (QoS) Task Group, "WMM including APSD Specification—Draft," Wi-Fi Alliance, pp. 1-38.

"Wi-Fi Certified™ for WMM™—Support for Multimedia Applications with Quality of Service in Wi-Fi® Networks," Wi-Fi Alliance, pp. 1-12, Sep. 1, 2004.

"WMM™ Power Save for Mobile and Portable Wi-Fi® Certified Devices," Wi-Fi Alliance, pp. 1-12, Dec. 2005.

US Patent Application, "Devices, System and Method for Coordinating Power Saving With Access Categories," filed on Mar. 31, 2005.

"Session Initiation Protocol (SIP)", Apr. 12, 2005, 3 pages, Cisco Systems, Inc.

"Cisco Documentation; Chapter 1: Overview of the session Initiation Protocol", Sep. 28, 2002, 7 pages, Cisco Systems, Inc.

"IEEE 802.11e—Wikipedia, the free encyclopedia", http://en.wikipedia.org/wiki/IEEE_802.11e, <Retrieved from Internet on Jun. 24, 2009>4 pages.

Chesson, Greg et al., "How To Use VoIP On Your Wireless LAN", May 31, 2005, 5 pages, Atheros Communications Inc.

Chung, Simon et al., "Understanding the MAC impact on 802.11e: Part 2", Oct. 30, 2003, 7 pages, CommsDesign.

Godfrey, Tim, "Inside 802.11e: Making QoS Reality over WLAN Connections", Dec. 19, 2003, 9 pages, CommsDesign.

Liaw, Guan-Hsiung, "An Overview of 802.11e", http://netlab18.cis.nctu.edu.tw/html/wlan_course/powerpoint/802.11e.pdf, <Retrieved from Internet on Jun. 24, 2009> Oct. 27, 2005, pp. 1-70.

Ramesh, Sridhar, "Adaptive APSD: A Low Power Scheduling Protocol for IEEE 802.11 Wireless LANs", IEEE, Jan. 12, 2006. pp. 1-5, ISBN 0-7803-9575-1/06.

Gu, Daqing et a., "QoS Enhancement in IEEE802.11 Wireless Local Area Networks", IEEE Communications Magazine, Jun. 2003, pp. 120-124, Mitsubishi Electric Laboratories.

Shepard, Andrew, "Hybrid Change Makes WLAN QoS Come to Life", Apr. 28, 2004, 6 pages, CommsDesign.

Banginwar, Rajesh et al., "Gibraltar: Application and Network Aware Adaptive Power Management for IEEE 802.11", IEEE Computer Science, Proceedings of the Second Annual Conference on Wireless On-demand Network Systems and Services, 2004, 10 pages.

Shao, Wenijian et al., "A Power-Controlled MAC Supporting Service Differentiation in Mobile Ad hoc Networks", IEEE 16$^{th}$ International Symposium on Personal, Indoor and Mobile Radio Communications, 2005, pp. 2742-2746.

Tsai, Tzu-Chieh et al., "An Analytical Model for IEEE 802.11e EDCA", 2005 IEEE Conference, May 2005, pp. 3474-3478.

IEEE Standard 802.11, 1999 Ed. (ISO/IEC 8802-11: 1999), 528 pages.

IEEE 802.11e/D13.0, Standard for Information Technology—Telecommunications and Information Exchange Between Systems—Local and Metropolitan Area Networks—Specific Requirements Part 11: Wireless LAN Medium Access Control (MAC) and Physical Layer (PHY) Specifications: MAC Quality of Service Enhancements, IEEE draft standard, Jan. 2005, pp. 1-182.

IEEE 802.11e Standard for Information Technology—Telecommunications and Information Exchange Between Systems—Local and Metropolitan Area Networks—Specific Requirements Part 11: Wireless LAN Medium Access Control (MAC) and Physical Layer (PHY) Specifications: Amendment 8: Medium Access Control (MAC) Quality of Service Enhancements, 2005, 211 pages.

* cited by examiner

LEARNING MECHANISM TO CONFIGURE POWER SAVE PARAMETERS FOR AUTOMATIC POWER SAVE DELIVERY

TECHNICAL FIELD

This disclosure relates generally to wireless networks, and in particular but not exclusively, relates to configuring power save parameters for automatic power save delivery ("APSD").

BACKGROUND INFORMATION

Wireless local area networks ("WLANs") providing broadband wireless connectivity have become tremendously successful in the business and consumer marketplaces. Traditionally, the principal application for WLANs has been providing data connectivity (e.g., web browsing and email) to portable/mobile devices. However, the last few years have demonstrated a growing interest in using WLANs to support voice and video applications (e.g., Voice-over-IP ("VoIP") telephony, streaming video, and streaming audio).

Since power consumption is often an important constraint on the operability and desirability of portable/mobile devices, implementing VoIP or streaming audio/video in a power saving conscious manner is important. The 802.11 standard (IEEE-802.11, 1999 Ed. (ISO/IEC 8802-11:1999)) defines a legacy Power Save ("PS") mode of operation. However, the legacy PS mode of operation, which uses a regularly scheduled beacon and polling mechanism, is not well suited for VoIP and streaming audio/video applications where traffic load is very high. Accordingly, the 802.11e standard (IEEE Std. 802.11e/D13.0, January 2005 (Draft Amendment to IEEE Std. 802.11, 1999)) introduced a different delivery mechanism, known as Unscheduled Automatic Power Save Delivery ("UAPSD"), which is also extended by the Wi-Fi Alliance ("WFA") as part of the Wi-Fi Multimedia ("WMM") including APSD Specification. The UAPSD delivery mechanism is implemented with trigger and delivery mechanisms. Due to its unscheduled nature, UAPSD is better suited to manage the periodic traffic characteristics typical of VoIP and streaming audio/video applications.

Even UAPSD alone may provide unsatisfactory performance for VoIP and streaming audio/video applications over WLANs, if UAPSD parameters are not appropriately selected for the anticipated traffic. Accordingly, the WMM including APSD Specification (WFA, Version X.X) defines an Admission Control Mechanism ("ACM") for negotiating UAPSD parameters in advance of anticipated traffic. ACM must be supported by applications on both sides of the wireless link between the wireless client station ("STA") and the wireless access point ("AP"). To configure the UAPSD parameters to optimize the delivery mechanism for the VoIP traffic, the STA and the AP exchange TSPEC frames (e.g., ADDTS and DELTS) to setup and tear down UAPSD parameters. However, the WMM including APSD Specification defines ACM as optional. Accordingly, if either the STA or the AP does not support ACM, the explicit traffic reservation mechanism cannot be used and default UAPSD parameters may be unsuitably selected for future traffic conditions.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system and method of a learning mechanism for optimizing power save parameters are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
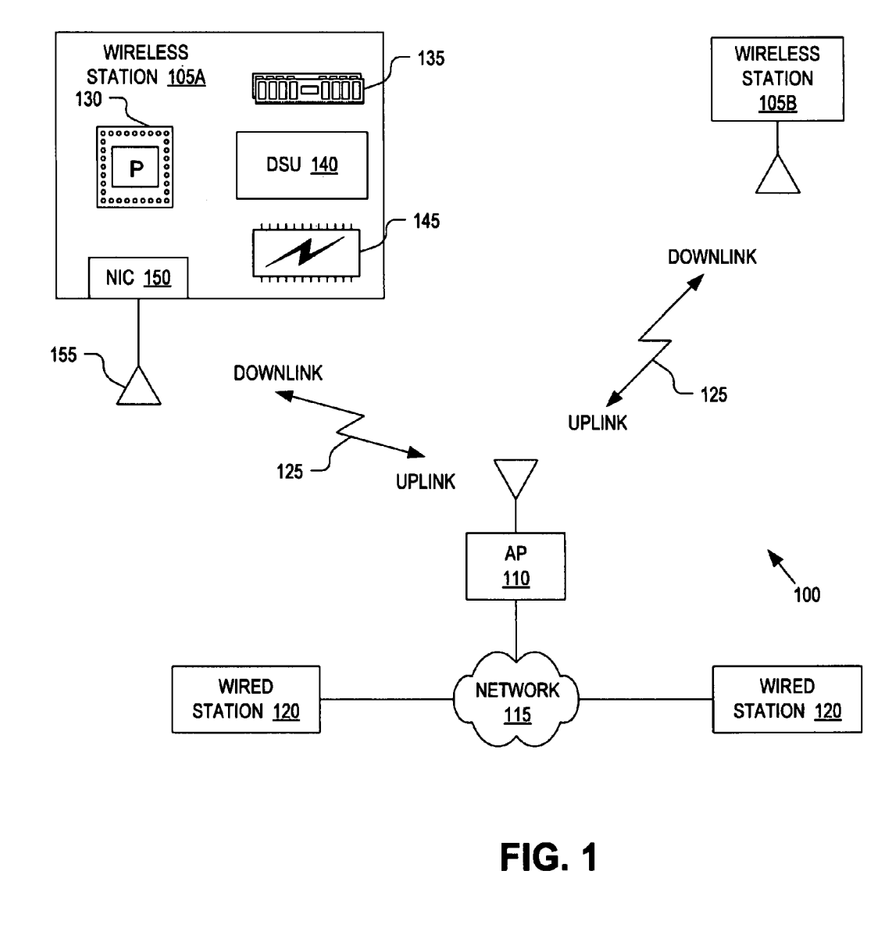
FIG. 1 is a diagram illustrating a wireless local area network ("WLAN") including wireless client stations and a wireless access point, in accordance with an embodiment of the invention.

FIG. 1 is a diagram illustrating a wireless local area network ("WLAN") 100 including wireless client stations (STAs) 105A and 105B (collectively STAs 105) and a wireless access point ("AP") 110, in accordance with an embodiment of the invention. AP 110 is further coupled to a wired network 115, such as a local area network ("LAN"), a wide area network ("WAN"), the Internet, or the like. Network 115 in turn may be coupled to any number of wired stations 120, which may communicate with STAs 105 via network 115, AP 110, and wireless links 125.

AP 110 provides a wireless point of entry for STAs 105 to communicate over network 115 with wired stations 120 or even communicate with each other. STAs 105 may represent a variety of different processing systems including personal computers, notebook computers, personal data assistants ("PDAs"), or other mobile devices with wireless communication capabilities.

As a matter of convention, traffic originating at any of STAs 105 and bound for AP 110 is traveling in an uplink direction, while traffic output from AP 110 and bound for any of STAs 105 is traveling in a downlink direction. Data traffic communicated over wireless links 125 may assume various forms such as for example infrared or other electromagnetic waves. STAs 125 and AP 110 may exchange data over wireless links 125 accordingly to a variety of communication protocols and standards. For example, STAs 125 and AP 110 may communicate with each other according to the Institute of Electrical and Electronics Engineers ("IEEE") Std. 802.11, 1999 Ed. (ISO/IEC 8802-11:1999) and more particularly the IEEE Std. 802.11e/D13.0, January 2005 (Draft Amendment to IEEE Std. 802.11, 1999). STAs 125 and AP 110 may also be compliant with other IEEE standards including 802.11a/b/g, standards promulgated by the Wi-Fi Alliance ("WFA"), or otherwise.

The internal subcomponents of STA 105A are illustrated; however, it should be appreciated that STA 105B may be similar or identical to STA 105. Furthermore, although WLAN 100 is illustrated with only two STAs 105 communicatively coupled to AP 110, more or less STAs 105 may in fact communicate with AP 110 at a given time. The illustrated embodiment of STA 105A includes one or more processors 130, system memory 135, a data storage unit ("DSU") 140, non-volatile ("NV") memory 145, a wireless network interface card ("WNIC") 150, and an antenna 155.

The elements of STA 105A are interconnected as follows. Processor(s) 130 is communicatively coupled to system memory 135, DSU 140, NV memory 145, and WNIC 150, to send and to receive instructions or data thereto/therefrom. In one embodiment, NV memory 145 is a flash memory device. In other embodiments, NV memory 145 includes any one of read only memory ("ROM"), programmable ROM, erasable programmable ROM, electrically erasable programmable ROM, or the like. In one embodiment, system memory 135 includes random access memory ("RAM"), such as dynamic RAM ("DRAM"), synchronous DRAM ("SDRAM"), double data rate SDRAM ("DDR SDRAM"), static RAM ("SRAM"), and the like. DSU 140 represents any storage device for software data, applications, and/or operating systems, but will most typically be a nonvolatile storage device. DSU 140 may optionally include one or more of an integrated drive electronic ("IDE") hard disk, an enhanced IDE ("EIDE") hard disk, a redundant array of independent disks ("RAID"), a small computer system interface ("SCSI") hard disk, and the like. Antenna 150 may represent any number or type of antennas for sending and receiving electromagnetic radiation. In one embodiment, antenna 150 is a dipole antenna. It should be appreciated that various other elements of STA 105A have been excluded from FIG. 1 and this discussion for the purposes of clarity.

During operation, STA 105A may operate in a variety of states, such as an active mode ("AM") state or a PS state. The AM state is a state of operation of STA 105A wherein STA 105A is always ready to receive traffic from AP 110 over wireless link 125. In contrast, the PS state is a state of operation of STA 105A in which it may doze to conserve power and therefore not always be ready to receive traffic from AP 110. At any given moment while operating within the PS state, STA 105A may be either awake and able to receive frames or dozing to conserve power. Therefore, AP 110 cannot free transmit traffic to STA 105A while STA 105A is operating in the PS state. Rather, as traffic arrives at AP 110 bound for STA 105A, AP 110 will queue the traffic until AP 110 receives a solicitation or request for queued data from STA 105A. Since STA 105A is always awake when operating in the AM state, AP 110 need not wait for a queued data requested from STA 105A, but rather will transmit any received traffic immediately on the wireless link 125. However, maintaining STA 105A in a constant AM state is costly in terms of power consumption.

STA 105A notifies AP 110 of transitions between the AM state and the PS state. If the STA 105A is to exit the AM state to enter the PS state, STA 105A will transmit an indication to AP 110 to this effect. Conversely, if STA 105A is to exit the PS state to enter the AM state, then STA 105A will transmit an indication to AP 110 to this effect. Thus, AP 110 is always cognizant whether STA 105A is in the PS state or AM state; however, AP 110 is not constantly aware of whether STA 105A is dozing or awake while in the PS state.

As mentioned above, while operating in the PS state, STA 105A may be awake or dozing at any given moment. Accordingly, STA 105A transmits solicitations or requests to indicate to AP 110 that it is currently awake and ready for delivery of the queue data traffic, if any. Two types of known PS modes of operation include legacy PS and automatic power save delivery ("APSD") or unscheduled APSD ("UAPSD"). Legacy PS is defined in the initial IEEE 802.11 standard while UAPSD is defined in the IEEE 802.11e standard and the WMM Including APSD Specification promulgated by the Wi-Fi Alliance. It is noteworthy that the AM state is also a legacy state defined in the initial IEEE 802.11 standard.

Figure 2:
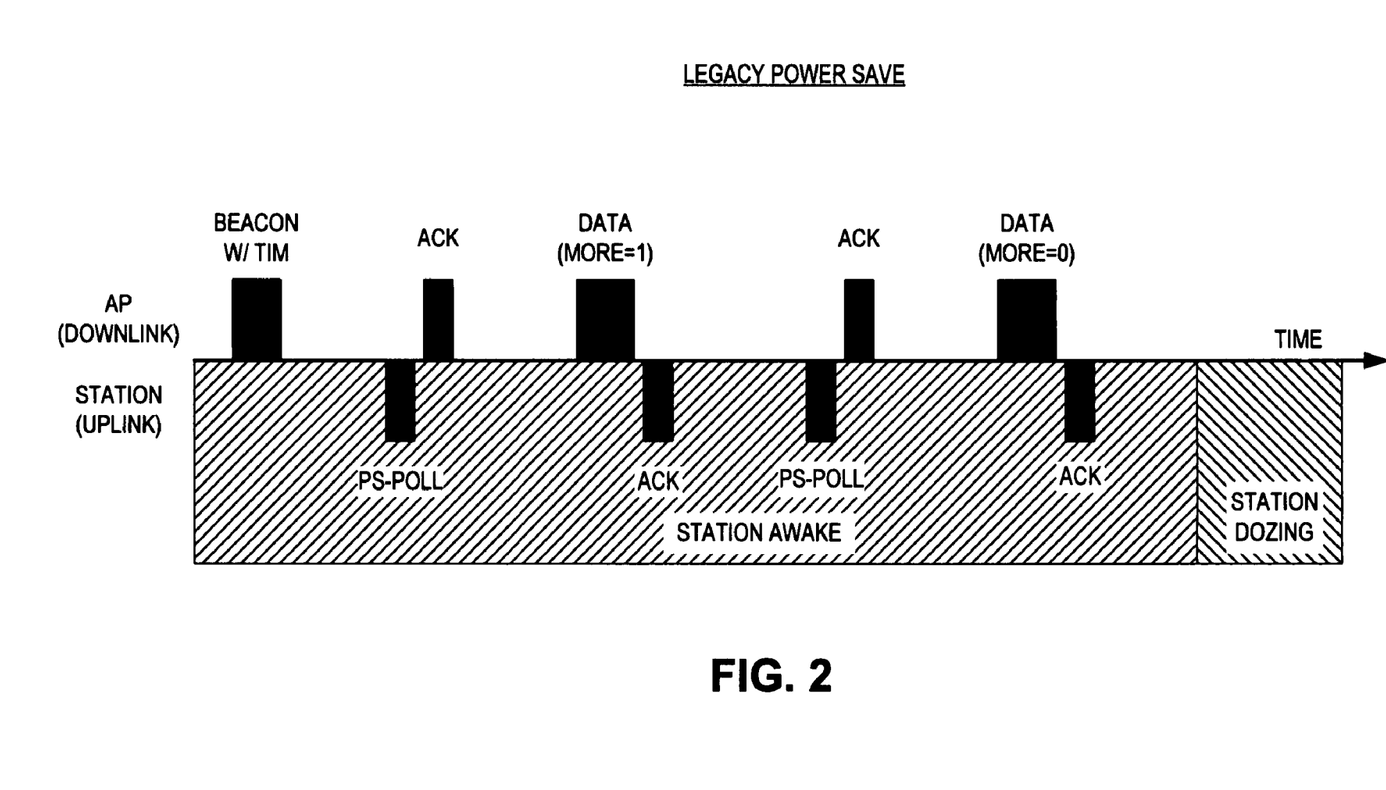
FIG. 2 is a timing diagram illustrating frame delivery using legacy power save.

FIG. 2 is a timing diagram illustrating frame delivery using legacy PS. Legacy PS enables STA 105A to become inactive, or doze, when there is no traffic from AP 110. While operating in the legacy PS state, to extend battery life, STA 105A attempts to minimize the amount of time spent transmitting and receiving (i.e., awake). AP 110 supports legacy PS by buffering data frames for each STA 105 and delivering the data frames when STAs 105 are awake.

FIG. 2 illustrates how this is achieved. STA 105A waits to receive a beacon frame from AP 110. The beacon frame includes a traffic indication map ("TIM") that informs STA 105A whether there are any data frames queued and waiting for delivery to STA 105A. If there are no data frames currently queued for STA 105A, then STA 105A can doze until the next beacon frame. However, if there is a data frame queued and waiting for STA 105A, then STA 105A will transmit a PS-poll frame, after the beacon frame, as a solicitation or request to download its queued data frames. After transmitting the PS-poll frame, AP 110 will acknowledge receipt of the PS-poll frame, and deliver a single data frame with an indication of whether more data frames are queued for STA 105A. Legacy PS requires the delivery of each data frame from AP 110 to STA 105A to follow a "PS-poll-ACK-data frame-ACK" frame sequence. Another option is for STA 105A to exit the PS mode upon receipt of indication that there are data frames pending for it and then return to the PS mode, once there is no more traffic to deliver.

Figure 3:
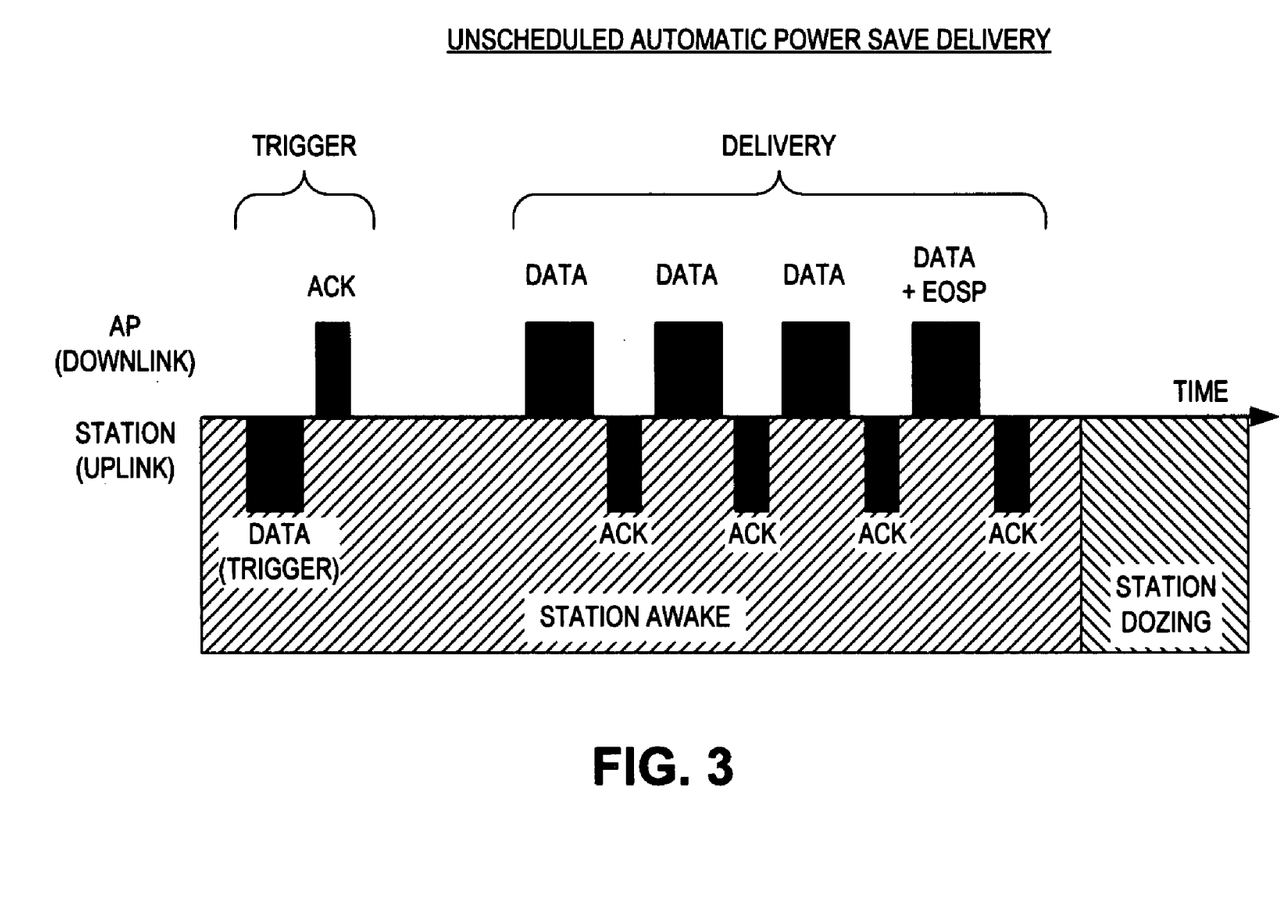
FIG. 3 is a timing diagram illustrating frame delivery using unscheduled automatic power save delivery ("UAPSD").

FIG. 3 is a timing diagram illustrating frame delivery using UAPSD. UAPSD improves the efficiency of legacy PS by increasing the amount of time STA 105A is allowed to doze and by decreasing the number signaling frames that must be conveyed between AP 110 and STA 105A to deliver each data frame. UAPSD is implemented with a trigger and delivery mechanism. Due to its unscheduled nature, UAPSD is better suited to manage the periodic traffic characteristics typical of VoIP and streaming audio/video applications.

While legacy PS requires AP 110 to wait until STA 105A receives a beacon frame to then initiate download of queued data frames, UAPSD enables STA 105A to initiate the download at anytime. FIG. 3 illustrates the trigger and delivery mechanism used by UAPSD to convey queued data frames from AP 110 to STA 105A. To initiate delivery of a data frame, STA 105 transmits a trigger frame to AP 110. The trigger frame, which initiate a Service Period, may be transmitted without any payload or piggybacked on a data frame transmitted by STA 105A in the uplink direction (illustrated).

After STA 105A transmits the trigger frame, AP 110 acknowledges (ACK) that it is prepared to transmit one or more queued data frames. The data frames are then sent during an enhanced distributed channel access ("EDCA")

Transmit Opportunity ("TXOP") burst, with each data frame interleaved with an ACK frame from STA 105A. The last data frame from AP 110 includes an end of service period ("EOSP") bit set, which indicates that the Service Period has ended. STA 105A can then resume dozing.

PS parameters used during the UAPSD are negotiated when a traffic stream is established between the application on both sides. Such PS parameters may include the period between which STA 105A transmits trigger frames to AP 110 to download its queued data frames. Transmit and receive timeout intervals for STA 105A, doze or snooze intervals, and the like are driven from the above. For time sensitive protocols, such as telephony, voice-over-IP ("VoIP"), audio streaming, video streaming, and audio/video streaming), the trigger rate is important. If the trigger rate is set too fast, then STA 105A will waste power and bandwidth on wireless link 125. If the trigger rate is set too slow, then the time sensitive protocols will suffer quality of service ("QoS").

Often, VoIP or other voice data uses a data sampling rate, corresponding to a service interval of 20 ms. Therefore, data frames carrying voice traffic for an active session, would arrive on average at AP 110 approximately every 20 ms. For such a stream of voice traffic, setting the trigger rate of STA 105A approximately equal to every 20 ms would be desirable to allow STA 105A to doze as often as possible while minimizing delays. A trigger rate greater than every 20 ms for this stream of voice traffic would needlessly waste power, while a trigger rate less than every 20 ms would result in additional traffic delivery delays thereby sacrificing the QoS.

However, since current implementations of UAPSD negotiate PS parameters (including trigger rate) with AP 110 during the association process between STA 105A and AP 110, STA 105A can only speculate as to the type of traffic (e.g., voice, video, email, web surfing, etc.) it will receive and select PS parameters accordingly. Furthermore, if STA 105A receives different types of traffic at different times, the PS parameters it selected during its initial association with AP 110, will at best be a compromise value. UAPSD does not provide any mechanism to tailor PS parameters on a real-time basis according to the type of traffic it is receiving at any given time.

During operation, processor(s) 130 may execute code suitable for determining the access category ("AC") of a transmitted or received frame in the uplink or downlink directions. There are four typical ACs including: AC-voice ("AC-VO"), AC-video ("AC-VI"), AC-best effort ("AC-BE"), and AC-background ("AC-BK"). PS parameters may be independently selected and set for each AC. In some embodiments, processor(s) 130 select a PS parameter that is applicable to the AC of a particular packet or flow of packets communicated over wireless link 125. In some embodiments, PS parameters associated with a particular AC may be determined from other sources.

Figure 4:
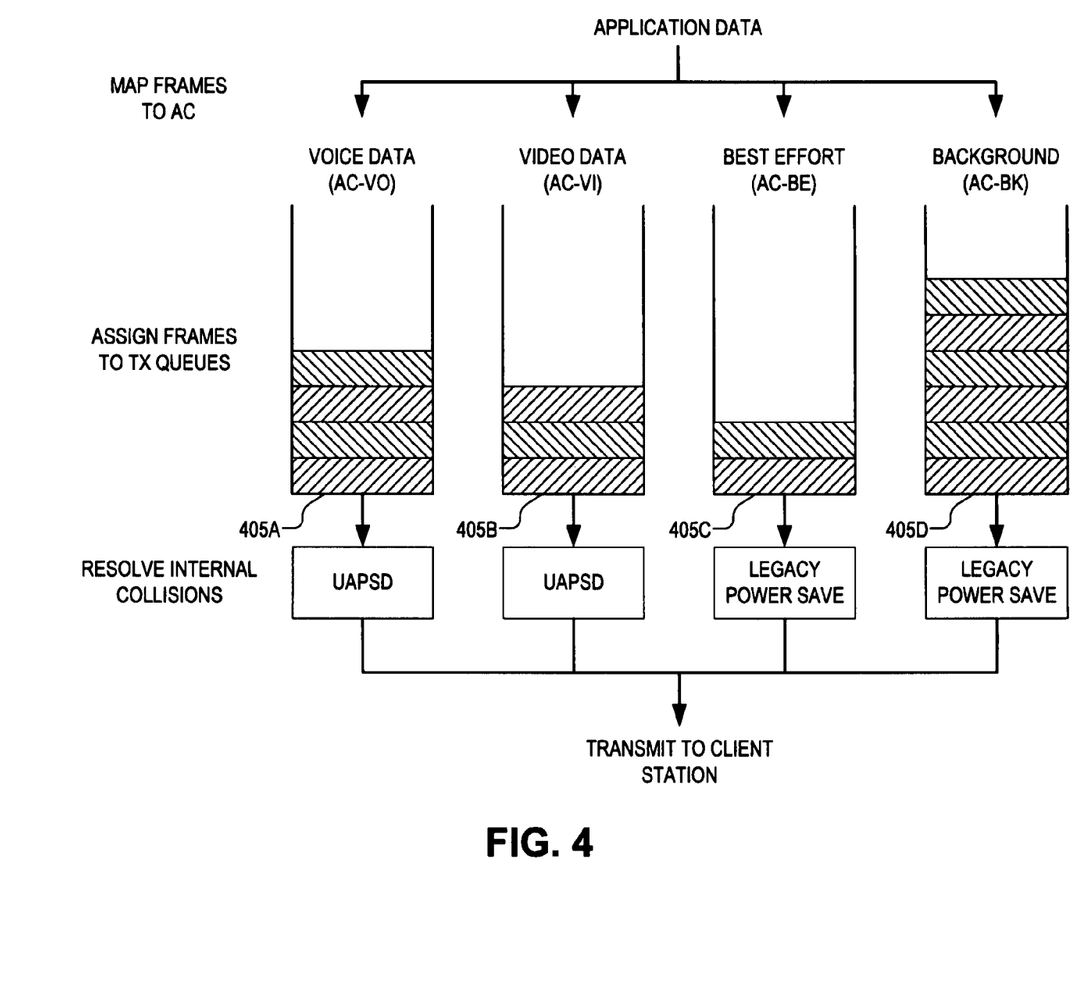
FIG. 4 is a diagram illustrating the allocation of different types of frame data to access categories for delivery using legacy power save or UAPSD, in accordance with an embodiment of the invention.

FIG. 4[a1] is a diagram illustrating an allocation of different types of frame data to ACs for delivery using either legacy PS or UAPSD, in accordance with an embodiment of the invention. As data frames arrive at AP 110 from any of wired stations 120 or STA 105B, AP 110 maps the data frames into TX queues 405. Which particular queue 405 a data frame is mapped to is dependent upon the type of data or traffic carried within the data frame. Voice traffic is mapped into AC-VO queue 405A, video traffic is mapped into AC-VI 405B, and other types of traffic are mapped into AC-BE queue 405C (e.g., email) and AC-BK queue 405D.

Once queued, data frames may be delivered while STAs 105 are operating in the AM state, the legacy PS state, or the UAPSD state. In one embodiment, UAPSD is a delivery mechanism which may be reserved for voice and video traffic, while legacy PS may be used for best effort and background traffic. Accordingly, FIG. 4 illustrates this embodiment with UAPSD illustrated as the delivery mechanism for AC-VO and AC-VI, and legacy PS illustrated as the delivery mechanism for AC-BE and AC-BK.

Figure 5:
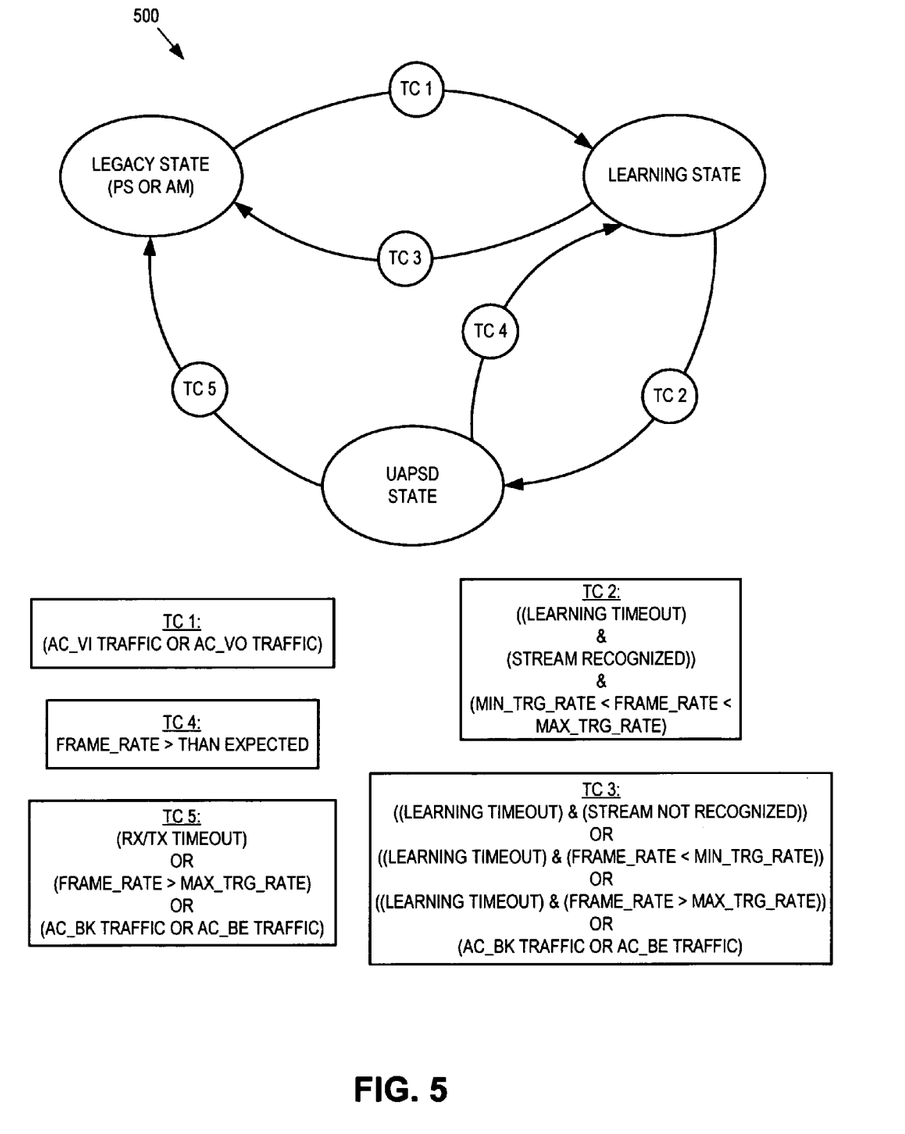
FIG. 5 is a state diagram illustrating a learning mechanism for optimizing UAPSD parameters, in accordance with an embodiment of the invention.
Figure 6:
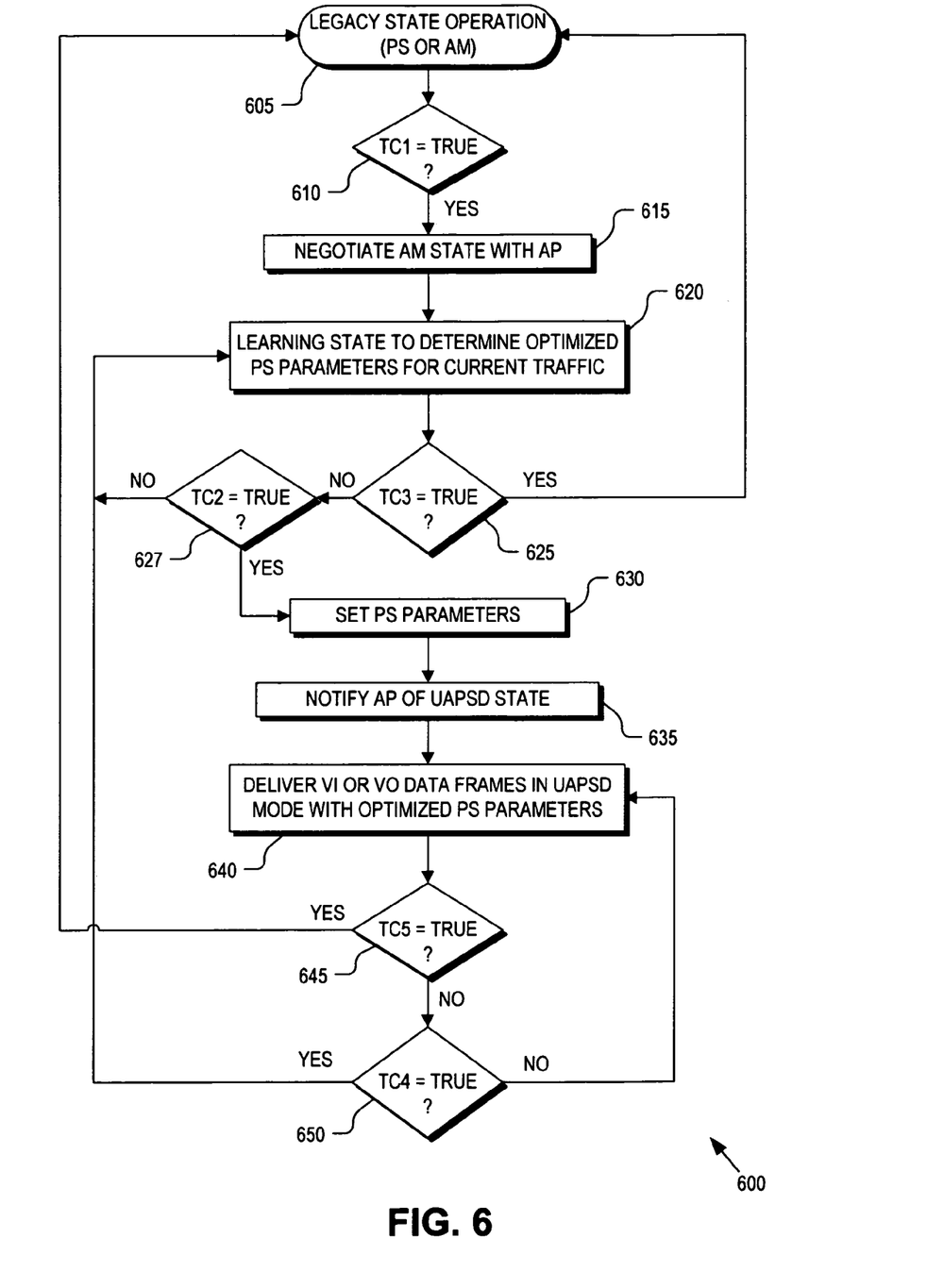
FIG. 6 is a flow chart illustrating a process for implementing a learning mechanism for optimizing UAPSD parameters, in accordance with an embodiment of the invention.

FIG. 5 illustrates a state diagram 500 for a learning mechanism implemented by STAs 105 to optimize PS parameters (e.g., UAPSD parameters), in accordance with an embodiment of the invention. FIG. 6 is a flow chart illustrating a process 600 for implementing the learning mechanism within one of STAs 105 in accordance with an embodiment of the invention. The order in which some or all of the process blocks appear in process 600 should not be deemed limiting. Rather, one of ordinary skill in the art having the benefit of the present disclosure will understand that some of the process blocks may be executed in a variety of orders not illustrated or even in parallel. The learning mechanism will be discussed with reference to both FIGS. 5 and 6.

In a process block 605, STA 105A is operating in one of the legacy states of operation (e.g., legacy PS state or AM state). In a decision block 610, if the transition condition TC1 is satisfied, then STA 105A will transition from the legacy state of operation into the learning state of operation. TC1 is satisfied if STA 105A receives a data frame while operating in the legacy state of operation assigned to either AC-VO or AC-VI. In other words, if a data frame is received by STA 105A which carries voice and/or video traffic, then STA 105A will transition into its learning state.

Either prior to or immediately after enter the learning state, STA 105A notifies AP 110 that STA 105A has entered the AM state (process block 615). Negotiating the AM state with AP 110 frees AP 110 to transmit data frames to STA 105A without buffering and without requiring a solicitation or request for data. It is noteworthy that while STA 105A negotiates the AM state with AP 110, it in fact enters a learning state unbeknownst to AP 110. Rather, AP 110 simply believes STA 105A is operating in the AM state and communicates with STA 105A as such. While STA 105A does remain awake and capable of receiving frames from AP 110 in the learning state, and therefore from a power consumption perspective is similar to the AM state, the learning state enables additional learning functionality of STA 105A.

Once STA 105A is operating in the learning state, STA 105A monitors the incoming traffic received from AP 110 for a period of time (e.g., 500 ms) to learn the traffic characteristics of the current flow of data frames (process block 620). The traffic characteristics monitored by STA 105A may include measuring the average frame rate arrival (or average delay between frames), peak frame rate, sustained frame rate, minimum frame rate, frame variation delay (e.g., burstiness of a flow of frames), frame loss ratio, or the like. In one embodiment, STA 105A counts the number of data frames communicated per AC and per direction (i.e., uplink or downlink). With these real-time measured values in hand, STA 105A can adjust or tailor PS parameters to the current traffic conditions based on the collected statistics. The traffic characteristics monitored above may be used to guarantee that STA 105A can distinguish between the AC being used and the actual type of traffic being sent. For example, if voice traffic is sent with AC-VI, it will not be considered as video traffic, because of its frame rate arrival.

Once operating in the learning state, if transition condition TC3 is satisfied, then STA 105A will transition back to one of the legacy states of operation (e.g., legacy PS state or AM state) (decision block 625). TC3 is satisfied if any of the following applies: (1) a learning timeout occurs and the stream of data frames are not recognized as being valid AC-VO or AC-VI traffic, (2) a learning timeout occurs and the frame rate of the communicated data frames is less than a minimum trigger rate, (3) a learning timeout occurs and the frame rate of the communicated data frames is greater than a maximum trigger rate, or (4) the data frames are of a type AC-BK or AC-BE traffic. As mentioned above, the illustrated embodiment reserves the UAPSD state of operation for AC-VO or AC-VI that should have a frame rate falling within a valid frame rate range.

In a decision block 627, if the transition condition TC2 is satisfied, then STA 105A will transition from the learning state of operation into the UAPSD state of operation. In one embodiment, TC2 is satisfied if all of the following applies: (1) a learning timeout (e.g., 500 ms) transpires, (2) the stream of data frames received at STA 105A from AP 110 is recognized as either voice traffic or video traffic, and (3) the measured frame rate is determined to fall within an acceptable frame rate.

In the illustrated embodiment, the frame rate is a sub-condition of transition condition TC2 to determine if the frame rate is too fast for a power saving state, such as UAPSD or even legacy PS. If the frame rate is greater than the maximum trigger rate (e.g., every 10 ms), the better choice may be for STA 105A to enter the AM state to receive the high bandwidth of traffic flowing downlink and/or uplink without dozing. Since voice and video traffic typically demands a certain minimum trigger rate (or maximum frame interval) to sustain a minimal level of QoS, if the frame rate measured in process block 620 is too low (e.g., below a minimum to reasonably sustain voice or video traffic), then STA 105A may assume that the received traffic is not truly voice or video traffic. In this case, STA 105A may decline to provide UAPSD delivery mechanisms to the incoming traffic flow. The inclusion of verifying that the frame rate is with in a valid trigger rate range, provides a gatekeeper functionality to prevent other traffic types (e.g., AC-BE or AC-BK) from masquerading as AC-VO or AC-VI categories to garner higher delivery priorities than otherwise would be permissible. Other reasons for validating the frame rate may also exist. In one embodiment, the stream of traffic received during the learning state may not be recognized as AC-VO or AC-VI traffic, if the frame intervals measured are not close to the standard frame intervals for voice or video traffic, respectively. In other embodiments, the AC-VI may be used for voice signaling traffic, hence may not be considered as video stream traffic.

In process block 630, STA 105A sets the PS parameters based on values determined from process block 620. In one embodiment, if the frames received during the learning state contain voice traffic (i.e., AC-VO), then the trigger interval (inverse of trigger rate) may be set to the average frame interval measured in process block 620 rounded up to a multiple of the typical voice sampling interval (e.g., 10 ms). In one embodiment, if the frames received during the learning state contain video traffic (i.e., AC-VI), then the trigger interval may be set to the average frame interval measured in process block 620 rounded up to a multiple of the typical video sampling interval, or STA 105A may be transitioned into the AM state, if the bit rate is too high$_{[a2]}$ After setting the PS parameters, STA 105A exits the learning state, negotiates its transition to the UAPSD state with AP 110, and commences operation in the UAPSD state (process block 635).

In process block 640, STA 105A continues to receive AC-VO or AC-VI type data frames from AP 110 in the UAPSD state using the UAPSD trigger and delivery mechanisms. The PS parameters used during the UAPSD state are the PS parameters determined in process block 620 and set in process block 630. For example, the trigger rate (or trigger interval) for transmitting the trigger frame (or data plus trigger frame) illustrated in FIG. 3 may be set based on the real-time frame rate measured and learned in process block 620.

The trigger rate is important in communication sessions where the uplink traffic is sporadic or considerably less frequent than the downlink traffic. Since UAPSD uses uplink data frames as trigger frames, if an uplink data frame is not transmitted by STA 105A within the required trigger interval, then an internal trigger of STA 105A may cause STA 105A to transmit a trigger frame without data. In one embodiment, a trigger tolerance of 10% may be used. If the trigger interval determined during the learning state is exceed by 10% without transmission of an uplink data frame on which a trigger frame may be piggybacked, then internal triggering will force transmission of a trigger frame without data.

In a decision block 645, if transition condition TC5 is satisfied, then STA 105A will transition back to one of the legacy states of operation (e.g., legacy PS state or AM state). TC5 is satisfied if any of the following applies: (1) a receive or transmit timeout occurs, (2) the frame rate of received data frames exceeds the maximum trigger rate, or (3) data frames of the type AC-BK or AC-BE are received. The occurrence of a receive timeout or a transmit timeout (e.g., 500 ms) may indicate that the current communication session or telephony call has ended and therefore triggering may be terminated (e.g., STA 105A returns to dozing). If the frame rate of the received data frames exceeds the maximum trigger rate, then transitioning to the AM state may be a more suitable state of operating given the high bandwidth of data frames being communicated over wireless link 125. If AC-BK or AC-BE traffic is received from AP 110, then transitioning to the legacy PS state may be more appropriate.

In a decision block 650, if the transition condition TC4 is satisfied, then STA 105A will transition from the UAPSD state of operation back into the learning state of operation. TC4 is satisfied if the frame rate of the current stream of data frames unexpectedly rises a threshold level over the measured frame rate measured in process block 620 and used to set the PS parameters (e.g., trigger rate) in process block 630. In one embodiment, STA 105A can determine that the frame rate has exceed the measured frame rate if more than an expected number of data frames is delivered to STA 105A for each trigger frame transmitted. For example, if the trigger rate is selected such that on average only one data frame is delivered for each trigger frame, then receiving more than one data frame per trigger frame for multiple consecutive trigger frames would be an indication that the frame rate of the data frames arriving at AP 110 for delivery to STA 105A has unexpectedly increased. In this event, STA 105A would transition back to the learning state, as illustrated by transition condition TC4 in FIG. 5, and process 600 would return to process block 620 to re-learn and readjust the PS parameters.

It should be appreciated that in various embodiments one or more of the sub-conditions within each transition condition illustrated in FIG. 5 may be excluded for various reasons or applications. Furthermore, other sub-conditions may be included as desired.

The processes explained above are described in terms of computer software and hardware. The techniques described may constitute machine-executable instructions embodied within a machine (e.g., computer) readable medium, that when executed by a machine will cause the machine to perform the operations described. Additionally, the processes may be embodied within hardware, such as an application specific integrated circuit ("ASIC") or the like.

A machine-accessible medium includes any mechanism that provides (i.e., stores and/or transmits) information in a form accessible by a machine (e.g., a computer, network device, personal digital assistant, manufacturing tool, any device with a set of one or more processors, etc.). For example, a machine-accessible medium includes recordable/non-recordable media such as ROM, RAM, magnetic disk storage media, optical storage media, flash memory devices, and the like.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method, comprising:
   receiving data frames carrying voice, video, or other multimedia traffic at a client station via a wireless link;
   measuring a frame rate of the received data frames for a period of time; and
   configuring a power save parameter of the client station based on the measuring to adjust a delivery characteristic of the data frames to the client station during a power save state of the client station,
   wherein the power save state comprises an unscheduled power save delivery state using trigger and deliver mechanisms for receiving the data frames over the wireless link.

2. The method of claim 1, wherein configuring the power save parameter of the client station comprises setting a trigger rate of the client station according to an estimation of the frame rate of the received data frames.

3. The method of claim 1, wherein measuring the frame rate of the received data frames comprises:
   entering the client station into a learning state;
   indicating to an access point via the wireless link that the client station has entered an active mode of operation to freely receive the data frames from the access point; and
   counting a number of the data frames received during the period of time while in the learning state.

4. The method of claim 3, wherein freely receiving the data frames comprises receiving the data frames without first transmitting one of a PS-poll frame or a trigger frame.

5. The method of claim 3, further comprising:
   exiting the learning state and entering the client station into the power save state if: (1) a learning timer expires, (2) the data frames received during the learning state are recognized as voice or video traffic, and (3) the frame rate is determined to be within a valid rate range; and
   indicating to the access point that the client station has entered the power save state.

6. The method of claim 5, further comprising returning the client station to the learning state if the frame rate of the data frames received during the power save state becomes greater than expected.

7. The method of claim 5, further comprising exiting the power save state and entering the client station into a legacy state of operation, if: (1) a received or transmit timer within the client station expires, (2) the frame rate of the data frames received during the power save state exceeds a maximum rate, or (3) any of background type traffic or best effort type traffic is received from the access point while in the power save state.

8. The method of claim 3, further comprising:
   exiting the learning state and returning the client station to a legacy state of operation if: (1) a learning timer expires and the data frames received during the learning state are not recognized as voice or video traffic, (2) the learning timer expires and the frame rate is determined to be outside a valid rate range, or (3) any of background type traffic or best effort type traffic is received from the access point while in the learning state.

9. A machine-readable storage medium that provides instructions that, if executed by a machine, will cause the machine to perform operations comprising:
   receiving data frames carrying voice or video traffic at a client station via a wireless link;
   measuring a frame rate of the received data frames for a period of time; and
   configuring a power save parameter of the client station based on the measuring to adjust a delivery characteristic of the data frames to the client station during a power save state of the client station,
   wherein measuring the frame rate of the received data frames includes:
      entering the client station into a learning state;
      indicating to an access point via the wireless link that the client station has entered an active mode of operation to freely receive the data frames from the access point; and
      counting a number of the data frames received during the period of time while in the learning state.

10. The machine-readable storage medium of claim 9 wherein the power save state comprises an unscheduled power save delivery state and wherein configuring the power save parameter of the client station comprises setting a trigger rate of the client station to approximately equal the frame rate of the received data frames.

11. The machine-readable storage medium of claim 9, further providing instructions that, if executed by the machine, will cause the machine to perform further operations, comprising:
   exiting the learning state and entering the client station into the power save state if: (1) a learning timer expires, (2) the data frames received during the learning state are recognized as voice or video traffic, and (3) the frame rate is determined to be within a valid rate range; and
   indicating to the access point that the client station has entered the power save state.

12. The machine-readable storage medium of claim 11, further providing instructions that, if executed by the machine, will cause the machine to perform further operations, comprising:
   returning the client station to the learning state if the frame rate of the data frames received during the power save state becomes greater than expected.

13. The machine-readable storage medium of claim 11, further providing instructions that, if executed by the machine, will cause the machine to perform further operations, comprising:
   exiting the power save state and entering the client station into a legacy state of operation, if: (1) a received or transmit timer within the client station expires, (2) the frame rate of the data frames received during the power save state exceeds a maximum rate, or (3) any of background type traffic or best effort type traffic is received from the access point while in the power save state.

14. The machine-readable storage medium of claim 9, further providing instructions that, if executed by the machine, will cause the machine to perform further operations, comprising:

exiting the learning state and returning the client station to a legacy state of operation if: (1) a learning timer expires and the data frames received during the learning state are not recognized as voice or video traffic, (2) the learning timer expires and the frame rate is determined to be outside a valid rate range, or (3) any of background type traffic or best effort type traffic is received from the access point while in the learning state.

15. A wireless client station, comprising:

a dipole antenna;

a processor to execute instructions, the processor coupled to the dipole antenna; and a memory to store the instructions, the memory coupled to the processor to provide the instructions thereto, which when executed by the processor cause the wireless client station to perform operations comprising:

receiving data frames carrying voice or video traffic via the dipole antenna;

measuring a frame rate of the received data frames for a period of time; and configuring a power save parameter of the wireless client station based on the measured frame rate to adjust delivery of the data frames to the wireless client station during a power save state of the wireless client station, wherein measuring the frame rate of the received data frames includes:

entering the wireless client station into a learning state;

indicating to an access point via a wireless link that the wireless client station has entered an active mode of operation to freely receive the data frames from the access point; and counting a number of the data frames received during the period of time while in the learning state.

16. The wireless client station of claim 15, wherein the memory stores further instructions, which when executed by the processor cause the wireless client station to perform further operations comprising:

exiting the learning state and entering the wireless client station into the power save state if: (1) a learning timer expires, (2) the data frames received during the learning state are recognized as voice or video traffic, and (3) the frame rate is determined to be within a valid rate range; and indicating to the access point that the wireless client station has entered the power save state.

17. The wireless client station of claim 16, wherein the memory stores further instructions, which when executed by the processor cause the wireless client station to perform further operations comprising:

returning the wireless client station to the learning state if the frame rate of the data frames received during the power save state becomes greater than expected.

18. The wireless client station of claim 16, wherein the memory stores further instructions, which when executed by the processor cause the wireless client station to perform further operations comprising:

exiting the power save state and entering the wireless client station into a legacy state of operation, if: (1) a received or transmit timer within the wireless client station expires, (2) the frame rate of the data frames received during the power save state exceeds a maximum rate, or (3) any of background type traffic or best effort type traffic is received from the access point while in the power save state.

19. The wireless client station of claim 15, wherein the memory stores further instructions, which when executed by the processor cause the wireless client station to perform further operations comprising:

exiting the learning state and returning the wireless client station to a legacy state of operation if: (1) a learning timer expires and the data frames received during the learning state are not recognized as voice or video traffic, (2) the learning timer expires and the frame rate is determined to be outside a valid rate range, or (3) any of background type traffic or best effort type traffic is received from the access point while in the learning state.

* * * * *

UNITED STATES PATENT AND TRADEMARK OFFICE
CERTIFICATE OF CORRECTION

| | | |
|---|---|---|
| PATENT NO. | : 7,668,129 B2 | Page 1 of 1 |
| APPLICATION NO. | : 11/393084 | |
| DATED | : February 23, 2010 | |
| INVENTOR(S) | : Alon et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 996 days.

Signed and Sealed this

Fourth Day of January, 2011

David J. Kappos
*Director of the United States Patent and Trademark Office*